(12) United States Patent
Suzuki

(10) Patent No.: US 6,648,112 B2
(45) Date of Patent: Nov. 18, 2003

(54) POWER TRANSMITTING APPARATUS WITH A TORQUE CONVERTER

(75) Inventor: Hosei Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/986,747

(22) Filed: Nov. 9, 2001

(65) Prior Publication Data

US 2002/0056599 A1 May 16, 2002

(30) Foreign Application Priority Data

Nov. 13, 2000 (JP) ........................................ 2000-344901

(51) Int. Cl.⁷ .............................................. F16H 45/02
(52) U.S. Cl. ....................... 192/3.25; 192/3.29; 192/212
(58) Field of Search ............................... 192/3.25, 3.29, 192/212

(56) References Cited

U.S. PATENT DOCUMENTS

| | | | | |
|---|---|---|---|---|
| 4,844,216 A | * | 7/1989 | Fukushima | 192/3.26 |
| 5,086,892 A | * | 2/1992 | Schierling | 192/3.29 |
| 5,195,621 A | * | 3/1993 | Dull et al. | 192/3.29 |
| 5,388,678 A | * | 2/1995 | Murata | 192/3.29 |
| 5,690,199 A | * | 11/1997 | Annic et al. | 192/3.29 |
| 5,937,978 A | * | 8/1999 | Fukushima | 192/3.29 |
| 6,478,127 B2 | * | 11/2002 | Fukushima | 192/3.29 |

FOREIGN PATENT DOCUMENTS

JP        2836319        10/1998

* cited by examiner

Primary Examiner—Saul Rodriquez
(74) Attorney, Agent, or Firm—McGinn & Gibb, PLLC

(57) ABSTRACT

A torque converter of a power transmitting apparatus includes a pump impeller connected to a crank shaft of an engine via a front cover, a turbine runner opposing thereto and an input clutch switching a relationship between the turbine runner and an input shaft to an engaged or disengaged state of an automatic transmission. A lockup clutch switched to an engaged or disengaged state with respect to the front cover includes a torsion damper provided between an upstream side plate fixed to the lockup clutch and a downstream side plate, in which a clutch drum is provided with an inertial mass at a downstream side of the torsion damper. Thereby, low-frequency sounds or vibrations in the power transmitting apparatus can be reduced.

25 Claims, 5 Drawing Sheets

|  | HC | RC | 2·4B | LC | LRB | FL |
|---|---|---|---|---|---|---|
| 1st |  |  |  | ○ | ○ | ○ |
| 2nd |  |  | ○ | ○ |  |  |
| 3rd | ○ |  |  | ○ |  |  |
| 4th | ○ |  | ○ |  |  |  |
| Rev |  | ○ |  |  | ○ |  |

○:ENGAGED

POWER TRANSMITTING APPARATUS WITH A TORQUE CONVERTER

BACKGROUND OF THE INVENTION

The present invention relates to a power transmitting apparatus with a torque converter in which a lockup clutch having a damper is provided, and more particularly to the apparatus capable of reducing a vibration at a time of engaging a lockup clutch.

Conventionally, the torque converter is mounted on the power transmitting apparatus having an automatic transmission for transmitting a power of an engine to the automatic transmission. In order to reduce a power loss of the torque converter and improve a specific fuel consumption performance of a vehicle, there is employed a structure in which a directly-coupled clutch, namely, the lockup clutch is assembled in the torque converter so as to directly connect an input shaft of the automatic transmission to a crank shaft.

As the automatic transmission, there are normal automatic transmissions (hereinafter, referred to as AT) having a planetary gear or the like and an automated manual transmission (hereinafter, referred to as AMT) having a plurality of transmission gear trains. The AMT is based on the structure of a manual type transmission, and includes an input shaft which is connected to an engine and to which a plurality of drive gears are attached, and an output shaft which is connected to drive wheels and to which a plurality of driven gears are attached in engaging with the drive gears to form transmission gear trains. The transmission gear trains are automatically switched by a hydraulically driven actuator according to a traveling state.

In both types of the automatic transmissions, when assembling the lockup clutch in the torque converter, a torsion damper, namely, a damper spring is attached to the lockup clutch in order to absorb a rotational fluctuation of an engine. When traveling in a state of engaging the lockup clutch, vibrations are usually transmitted to a vehicle body via the automatic transmission due to the rotational fluctuation of the engine. The vibration transmitting system at the time of engaging the lockup clutch is considered to be caused by following four elements; ① an inertia moment of rotating components at an upstream side of the torsion damper in a power transmitting path, namely, the inertia moment thereof at the engine side; ② an inertia moment of the rotational components at a downstream side of the torsion damper, namely, at the side of the automatic transmission; ③ a torsional rigidity of the torsion damper connecting the both sides; and ④ a torsional rigidity of the input shaft in the automatic transmission connecting with the vehicle body. In this vibration transmitting system, there are a primary resonance point in which the inertia moment at the upstream side and the inertia moment at the downstream side vibrate with the same phase, and a secondary resonance point in which those moments vibrate in reverse phases, respectively.

Japanese Patent No. 2836319 discloses a structure that an inertial mass is provided at the upstream side of the torsion damper within the torque converter, namely, at the engine side, in order to reduce a primary vibration, so that the inertia moment at the engine side is increased. However, when traveling in an engaging state of the lockup clutch, not only the primary resonance point but also the secondary resonance point is generated as mentioned above, where the inertia moments at the both upstream and downstream sides vibrate in the reverse phases. On the assumption that the secondary resonance is 30 Hz in a 4-cylinder engine, the rotational fluctuation is generated due to two explosions per one rotation, and thus an engine speed of the secondary resonance point is expressed by 30×60/2=900 rpm. When engaging the lockup clutch with the engine speed equal to or more than 1200 rpm or more, the secondary resonance point is very close to a range for practical use, so that there may occur a low-frequency sound or vibrations.

As a method of lowering the secondary resonance point, it is considered to reduce the torsional rigidity of the torsion damper and the input shaft, and also optimize a distribution of the inertia moments between the upstream side of the torsion damper and the downstream side thereof. Although the Japanese Patent as described above is available for lowering the primary resonance point since the inertial mass is provided at the upstream side of the torsion damper, it is impossible to lower the secondary resonance point. Accordingly, the conventional method can not prevent the low-frequency sound from being transmitted into a passenger's compartment.

SUMMARY OF THE INVENTION

An object of the present invention is to reduce low-frequency sounds or vibrations occurred in a power transmitting system of a power transmitting apparatus with a torque converter.

In accordance with the present invention, there is provided a power transmitting apparatus with a torque converter comprising a torque converter provided with a pump impeller connected to a crank shaft of an engine and a turbine runner opposing to the pump impeller, and a lockup clutch assembled within the torque converter with a torsion damper and connected to an input shaft of a transmission, wherein an inertial mass is provided at a downstream side of the torsion damper.

In accordance with the present invention, there is further provided the power transmitting apparatus with the torque converter comprising the torque converter provided with the pump impeller connected to the crank shaft of the engine and the turbine runner opposing to the pump impeller, and the lockup clutch assembled within the torque converter with the torsion damper and connected to then input shaft of the transmission, wherein an input clutch engaging and disengaging the turbine runner with the input shaft is provided between the turbine runner and the input shaft, and the inertial mass is provided in the input clutch.

The inertial mass of the present invention may be provided at an outer peripheral side of the input clutch, or may be formed by increasing a thickness of structuring elements of the torque converter or the transmission.

According to the present invention, the inertial mass functioning as a flywheel is provided at the downstream side of the torsion damper provided in the lockup clutch of the torque converter in the power transmitting path, thereby the inertia moment at the downstream side can come closer to the inertia moment at the upstream side, so that the secondary resonance point in the power transmitting system can be lowered. As an effect thereof, the low-frequency sound and the vibration transmitted within the passenger's compartment can be reduced.

Further, since the secondary resonance point is lowered, it is possible to expand the lockup area to a low speed and high load area, so that fuel consumption can be improved.

BRIEF DESCRIPTION OF THE DRAWINGS

The present invention will be more clearly understood from the description as set forth below with reference to the accompanying drawings, in which.

DETAILED DESCRIPTION OF THE PREFERRED EMBODIMENTS

Figure 1:
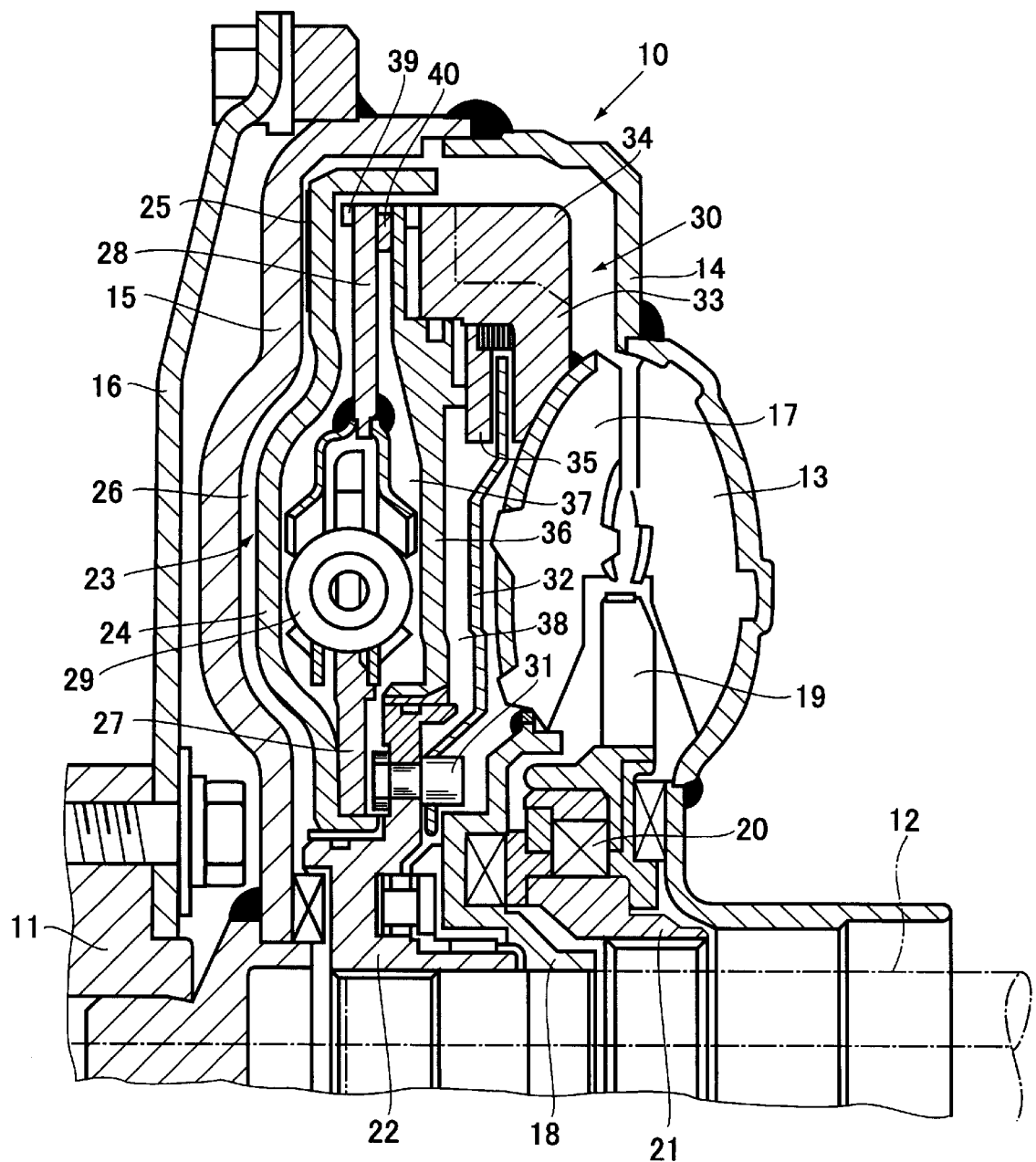
FIG. 1 is a half cross sectional view showing a part of a torque converter in a power transmitting apparatus in accordance with a first embodiment of the present invention.

FIG. 1 is a half cross sectional view showing a part of a torque converter in a power transmitting apparatus in accordance with an embodiment of the present invention. A torque converter 10 is provided between a crank shaft 11 of an engine and a main shaft of an automatic transmission, namely, an input shaft 12. The torque converter 10 includes a pump side outer shell 14 in which a pump impeller 13 is provided, and a front cover 15 fixed thereto. The front cover 15 is fixed to a drive plate 16 mounted to the crank shaft 11.

A turbine runner 17 is arranged so as to oppose to the pump impeller 13, and the turbine runner 17 is fixed to a rotatable holder 18. A stator 19 arranged between the pump impeller 13 and the turbine runner 17 is supported to a holder 21 via a one way clutch 20, and also the holder 21 is fixed to a transmission case by a hollow shaft (not shown).

A lockup clutch 23 is attached to a hub 22 connected to the input shaft 12 with splines. The lockup clutch 23 includes a lockup disc 24 attached to an outer periphery of the hub 22 so as to freely and relatively rotate with respect to the hub 22, and a friction member 25 engaging with the front cover 15 is provided on the lockup disc 24. An engagement between the lockup disc 24 and the front cover 15 is cancelled by a hydraulic pressure applied within an oil chamber 26 formed between the front cover 15 and the lockup disc 24. When releasing the hydraulic pressure, the lockup disc 24 slides forward to be directly connected to the crank shaft 11. An upstream side plate 27 is fixed to a center portion of the lockup disc 24, a torsion damper 29 is assembled between a downstream side plate 28 arranged outward in a diametrical direction of the upstream side plate 27 and the upstream side plate 27, and a rotation of the upstream side plate 27 is transmitted to the downstream side plate 28 via the torsion damper 29.

An input clutch 30 is provided between the hub 22 and the turbine runner 17. The input clutch 30 includes a clutch disc 32 fixed to the hub 22 by a pin 31 and a clutch drum 33 fixed to the turbine runner 17. An inertial mass 34 is integrally provided in the clutch drum 33. The inertial mass 34 is formed with a block shape by increasing a thickness of the clutch drum 33, and functions as a flywheel having a predetermined force of inertia.

In the case of fixing the clutch drum 33 to the turbine runner 17, it is possible to function as a clutch drum by setting a thickness to one shown by a two-dotted chain line in FIG. 1. However, it is possible to form the inertial mass 34 by utilizing a dead space between the clutch drum 33 and the pump side outer shell 14 and increasing the thickness of the clutch drum 33, so that the inertia moment of rotating elements including the turbine runner 17 can be increased. Moreover, although the clutch drum 33 and the inertial mass 34 are integrally formed as shown in FIG. 1, these parts may be independently structured, respectively, and the inertial mass 34 may be fixed to an outer side of the clutch drum 33. A clutch driven disc 35 is assembled in the clutch drum 33 so as to be freely movable in an axial direction thereof, and an outer peripheral portion of the clutch disc 32 is located between the clutch drum 33 and the clutch driven disc 35, wherein friction members are provided on both surfaces of the outer peripheral portions.

A clutch piston 36 is attached between the outer peripheral surface of the hub 22 and the clutch drum 33 so as to freely oscillate in the axial direction. When the clutch piston 36 moves toward the clutch disc 32 due to a hydraulic pressure applied to an oil chamber 37 formed in a side of the torsion damper 29 with regard to the clutch piston 36, the clutch disc 32 is engaged with the inertial mass 34 functioning as the clutch drum. When being engaged with in such a manner as mentioned above, the inertial mass 34 integrally rotates with the clutch disc 32. When increasing a pressure within an oil chamber 38 surrounded by the clutch piston 36 and the clutch drum 33 over the pressure within the oil chamber 37, the engagement of the input clutch 30 is cancelled.

A projection 39 protruding toward the lockup disc 24 is provided in the clutch drum 33, wherein tooth portions formed on each outer peripheral portion of the clutch piston 36 and the downstream side plate 28 are engaged with grooves formed in the projection 39, so that the clutch piston 36 and the downstream side plate 28 can integrally rotate with the inertial mass 34 and the turbine runner 17. A snap ring 40 is assembled with the projection 39 so as to form a stopper of the clutch piston 36 at a time of disengaging the input clutch 30.

The torque converter 10 as shown in FIG. 1 is mounted on the AMT having a plurality of transmission gear trains on the basis of the structure of the manual type transmission. The AMT is structured as mentioned above in which a plurality of transmission gear trains are formed by a plurality of drive gears attached to the input shaft 12 and the plurality of driven gears attached to the output shaft, and the transmission gear trains transmitting the power are automatically switched according to the traveling conditions by the hydraulically driven actuator. In the power transmitting apparatus having such a structure, the input clutch 30 is in the disengaged state when switching the transmission gear trains so as to execute the shift change or starting the engine. When the input clutch 30 is disengaged, the rotation of the crank shaft 11 is not transmitted to the input shaft 12 even if the lockup clutch 23 is in the engaged state.

On the other hand, in the state that the lockup clutch 23 is disengaged, and also the input clutch 30 enters in the engaged state due to the operation of the clutch piston 36, the torque converter 10 is in an operating condition, and the rotation of the turbine runner 17 is transmitted to the input shaft 12 via the clutch disc 32 and the hub 22. When the lockup clutch 23 is switched to a directly-coupled state, namely, a lockup state according to the traveling condition, the rotation of the crank shaft 11 is transmitted to the upstream side plate 27 fixed to the lockup disc 24 via the lockup disc 24. Next, the rotation of the upstream side plate 27 is transmitted to the downstream side plate 28 after the rotational fluctuation of the engine is absorbed by the torsion damper 29, and further the rotation of the downstream side plate 28 is transmitted to the input shaft 12 via the inertial mass 34, the clutch disc 32 and the hub 22.

As mentioned above, since the block-shaped inertial mass 34 is provided at the turbine runner 17 under the lockup state, the inertia moment at the downstream side of the torsion damper 29 in the power transmitting path having the inertial mass 34 functioning as the flywheel comes closer to the inertia moment of the upstream side including the flywheel provided at the crank shaft 11.

Accordingly, the secondary resonance point in the power transmitting system can be lowered since the secondary resonance is generated by the inertia moments at the upstream side and the downstream side of the torsion damper, the torsional rigidity of the torsion damper 29 itself, and the torsional rigidity of the input shaft 12.

Figure 2:
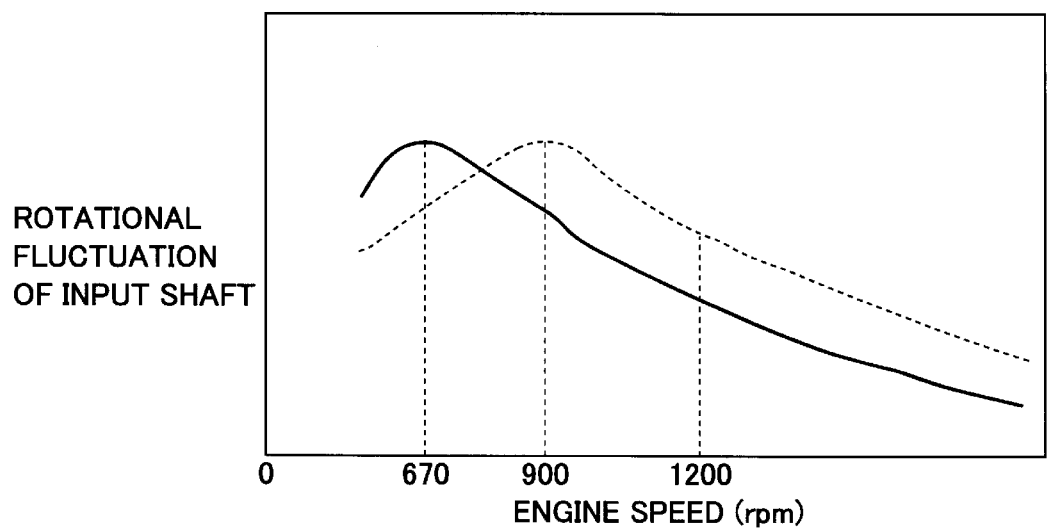
FIG. 2 is a characteristics graph showing a relationship between an engine speed and a rotational fluctuation of an input shaft in the power transmitting apparatus as shown in FIG. 1.

FIG. 2 is a characteristics graph showing a relationship between the engine speed and the rotational fluctuation of the input shaft 12 in the power transmitting apparatus of FIG. 1. In FIG. 2, a solid line shows the characteristics in the case of mounting the inertial mass 34 to the turbine runner 17, and a broken line shows the characteristics in the case of mounting the clutch drum 33 having the thickness shown by the two-dotted chain line in FIG. 1 to the turbine runner 17 without mounting the inertial mass 34. As shown in FIG. 2, in the case that the inertial mass 34 is not mounted to the clutch drum 33, the secondary resonance point is generated when the engine speed is about 900 rpm, and on the other hand, the secondary resonance point is lowered by mounting the inertial mass 34.

Accordingly, in the case that the engine speed is equal to or more than, for example, 1200 rpm, when making the lockup clutch 23 to be in the directly-coupled state, the rotational fluctuation of the input shaft 12 can be reduced in comparison with the case that the inertial mass 34 is not mounted, so that the low-frequency sound and the vibration within the passenger's compartment can be reduced.

Figure 3:
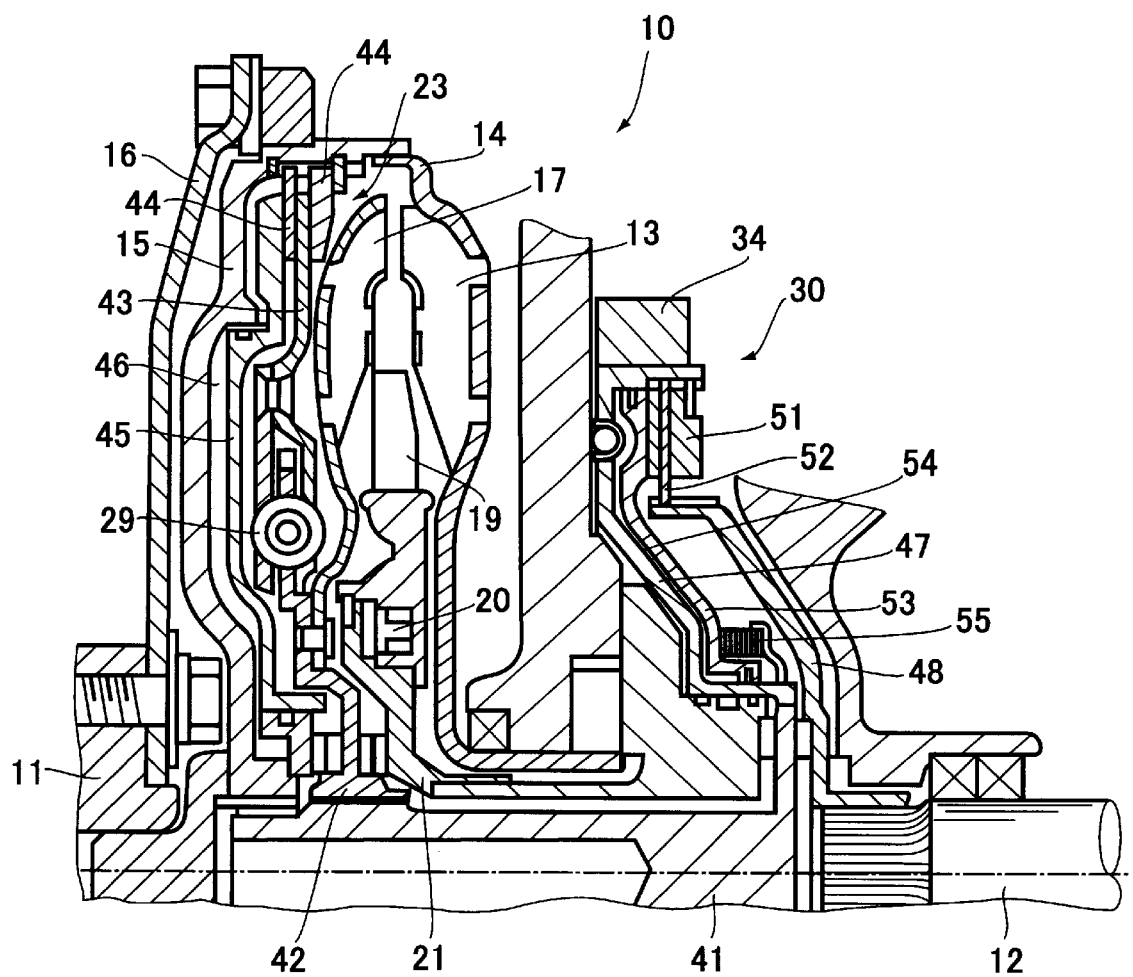
FIG. 3 is the half cross sectional view showing the power transmitting apparatus in accordance with the second embodiment of the present invention.

FIG. 3 is a half cross sectional view showing the power transmitting apparatus in accordance with the second embodiment of the present invention. In FIG. 3, the same reference numerals are attached to the same elements as those in the power transmitting apparatus as shown in FIG. 1.

In this figure, the turbine runner 17 in the power transmitting apparatus is mounted to a turbine hub 42 connected to a turbine shaft 41 with splines. The lockup clutch 23 includes a lockup disc 43 connected to the turbine hub 42 via the torsion damper 29, while annular clutch discs 44 are attached within a cylindrical portion of the front cover 15 so as to be freely movable in an axial direction thereof. An outer peripheral portion of the lockup disc 43 is located between two clutch discs 44. A clutch piston 45 is assembled between the front cover 15 and the lockup disc 43 in order to engage the lockup disc 43 with the clutch disc 44 so as to bring the lockup clutch 23 in the directly-coupled state or to cancel the engagement so as to bring the clutch 23 in a lockup disengaged state. The lockup clutch 23 comes into the directly-coupled state by applying the hydraulic pressure within an oil chamber 46 formed between the clutch piston 45 and the front cover 15.

The input clutch 30 is provided between the turbine shaft 41 and the input shaft 12 to be positioned outside the torque converter 10. The lockup clutch 23 is connected to the input shaft 12 via the turbine shaft 41 and the input clutch 30. The input clutch 30 includes a clutch drum 47 fixed to the turbine shaft 41 and a clutch hub 48 fixed to the input shaft 12. A clutch drive disc 51 is attached to the cylinder portion of the clutch drum 47 so as to be freely movable in the axial direction, and a clutch driven disc 52 is attached to the clutch hub 48 so as to be freely movable in the axial direction.

In order to operate the input clutch 30 in the engaged state and the disengaged state, a clutch piston 53 is attached to the clutch drum 47, wherein the input clutch 30 comes into the engaged state when applying the hydraulic pressure to an oil chamber 54 formed between the clutch piston 53 and the clutch drum 47. In order to urge a spring force in a returning direction to the clutch piston 53, a return spring 55 is provided between the clutch hub 48 and the clutch piston 53. The inertial mass 34 is integrally provided at the outer periphery of the cylindrical portion of the clutch drum 47. In this case, the inertial mass 34 may be separately formed from the clutch drum 47, that is, the block-shaped inertial mass 34 may be attached to the clutch drum 47.

In the power transmitting apparatus as shown in FIG. 3, it is possible to switch the transmission gear trains so as to execute the shift change or start the engine under the state of disengaging the input clutch 30. Under the state that the lockup clutch 23 is disengaged, the rotation of the crank shaft 11 is transmitted to the turbine runner 17 when the input clutch 30 is engaged due to the operation of the clutch piston 53. The rotation of the turbine runner 17 is transmitted to the input shaft 12 via the turbine shaft 41 and the input clutch 30. When the lockup clutch 23 is switched to the lockup state according to the traveling condition, the rotation of the crank shaft 11 is transmitted to the lockup disc 43 at the upstream side of the torsion damper 29 via the front cover 15. Next, the rotation of the lockup disc 43 is transmitted to the turbine hub 42 after the rotational fluctuation of the engine is absorbed by the torsion damper 29, and is further transmitted to the input shaft 12 via the turbine shaft 41 and the input clutch 30.

As mentioned above, the inertia moment at the downstream side of the torsion damper 29 in the power transmitting path provided with the inertial mass 34 functioning as the flywheel comes closer to the inertia moment at the upstream side including the flywheel provided at the crank shaft 11 since the clutch drum 47 of the input clutch 30 is provided with the block-shaped inertial mass 34 under the lockup state. Thereby, the secondary resonance point in the power transmitting system, which is generated by the moments of inertia at the upstream side and the downstream side, the torsional rigidity of the torsion damper 29 provided between the both sides, and the torsional rigidity of the input shaft 12, can be lowered.

FIG. 4A is a skeleton view showing the power transmitting apparatus in accordance with the third embodiment of the present invention. The torque converter 10 in the power transmitting apparatus as shown in FIG. 4A is a known structure having the lockup clutch 23, in which the automatic transmission is a normal AT having a planetary gear. That is, the torque converter 10 includes the turbine hub 42 to which the turbine runner 17 is fixed, and the lockup disc 43 is provided in the outer portion in a diametrical direction of the turbine hub 42 via the torsion damper 29. When the lockup disc 43 is engaged with the front cover 15, the torque converter 10 comes into the directly-coupled state. Further, the automatic transmission includes the input shaft 12 integrally formed with the turbine shaft of the torque converter 10, in which a first planetary gear mechanism 61 and a second planetary gear mechanism 62 are provided in the input shaft 12.

A high clutch HC engaged at a third speed range and a fourth speed range is provided between a clutch hub 64 connected to a planetary carrier 63 of the first planetary gear mechanism 61 and a clutch drum 65 fixed to the input shaft 12. A reverse clutch RC engaged at a time of backward moving is provided between a clutch hub 66 connected to a sun gear of the first planetary gear mechanism 61 and the clutch drum 65. Further, a second speed and fourth speed brakes 2·4B causing a braking state at a second speed range and the fourth speed range are provided between the clutch hub 66 and a transmission housing.

A low clutch LC engaged at a first speed range is provided between a clutch drum 67 connected to the planetary carrier 63 of the first planetary gear mechanism 61 and a clutch hub 68 connected to an internal gear of the second planetary gear mechanism 62. A low and reverse brake LRB engaged at the first speed range and the backward moving range and a low one way clutch FL are provided between the transmission case and the clutch drum 67.

A reduction drive shaft 71 is connected to a planetary carrier 69 of the secondary planetary gear mechanism 62, wherein the drive shaft 71 is connected to a front wheel output shaft 74 via reduction gears 72 and 73, and further the drive shaft 71 is connected to a rear wheel output shaft 75 via a transfer clutch TC.

FIG. 4B shows a relationship between each engagement and disengagement states of the frictional engaging elements of the AT shown in FIG. 4A and the transmission gear ratios. A shift change operation can be automatically executed by switching the frictional engaging element, that is, the clutch and the brake to the engaged state and the disengaged state according to the traveling conditions.

Figure 4:
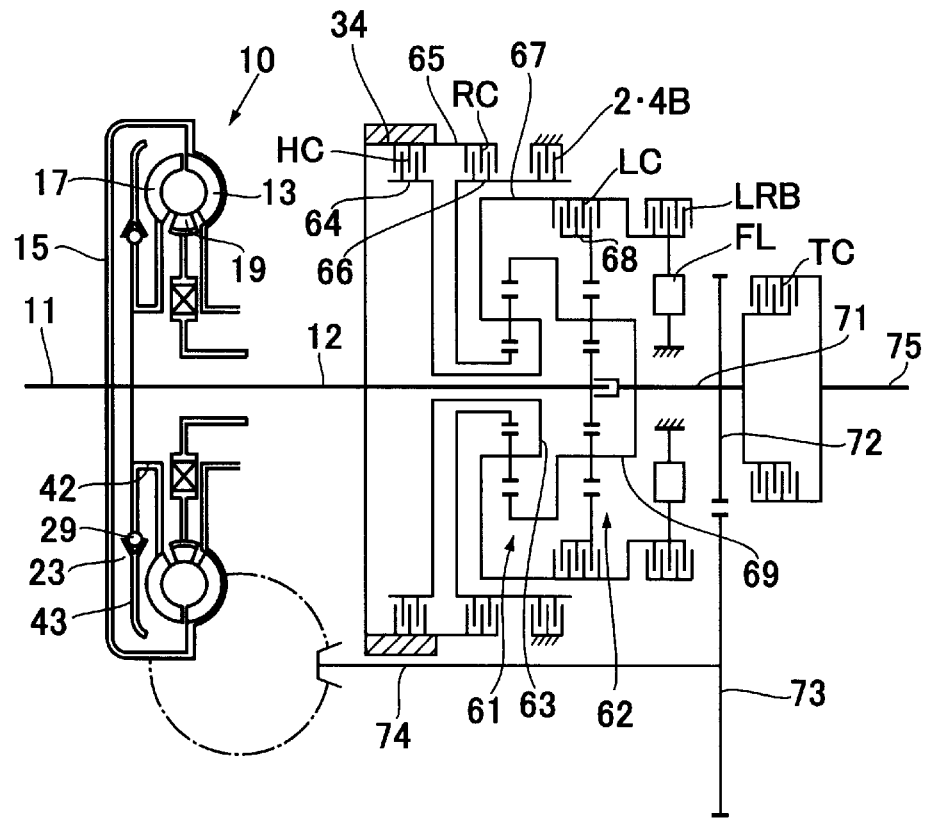
FIG. 4A is a skeleton view showing the power transmitting apparatus in accordance with the third embodiment of the present invention.
FIG. 4B is an operation table showing the relationship between an engagement and/or disengagement state of frictional engagement elements and a transmission gear ratio in the automatic transmission as shown in FIG. 4A.
Figure 5:
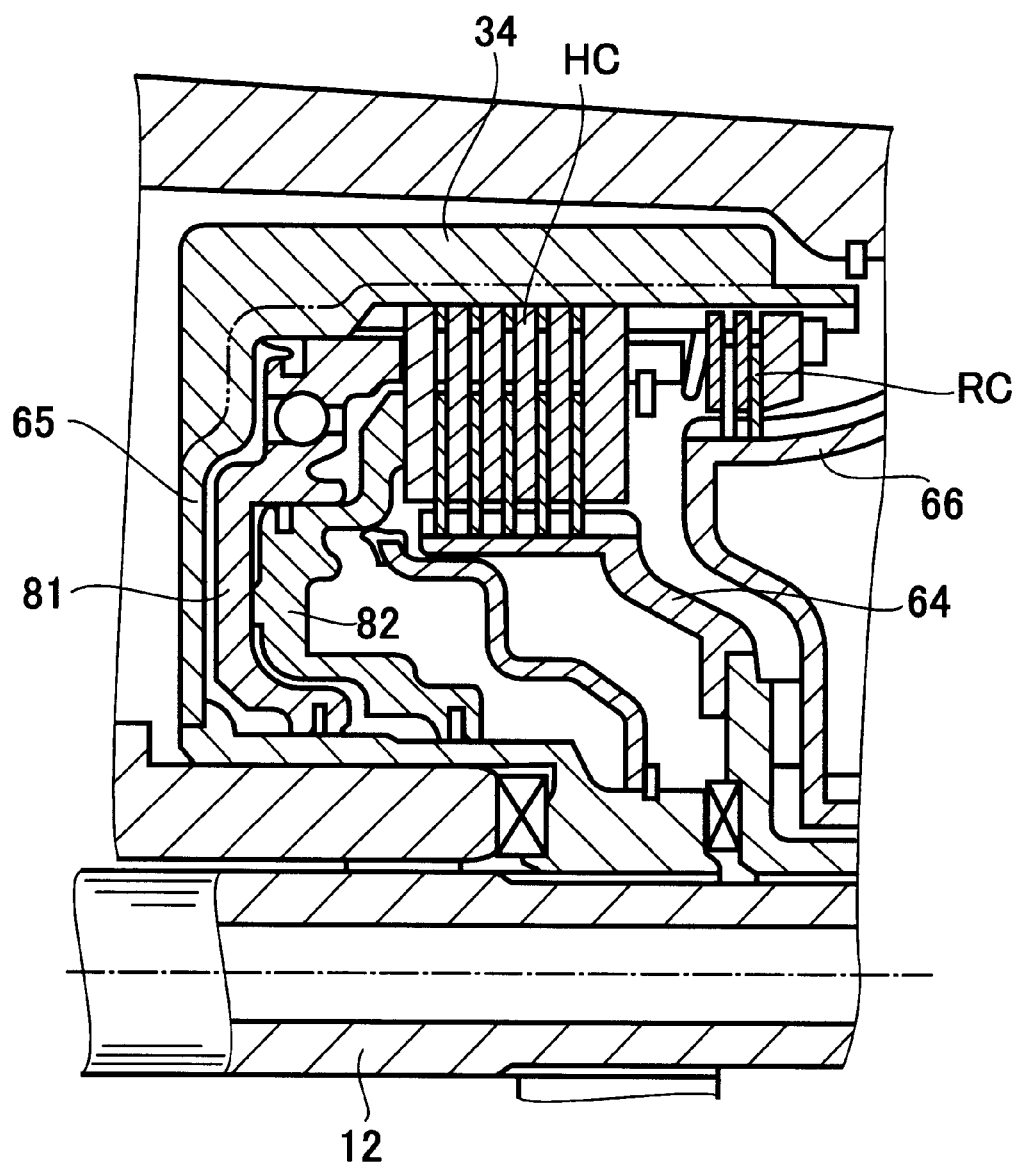
FIG. 5 is the cross sectional view showing the part of the automatic transmission as shown in FIG. 4A.

FIG. 5 is a cross sectional view showing a part of the AT as shown in FIG. 4A. The inertial mass 34 is integrally provided on the outer periphery of the clutch drum 65 connected to the input shaft 12. A clutch piston 81 is attached to the clutch drum 65 so as to operate the reverse clutch RC in the engaged state and the disengaged state, and further a clutch piston 82 is attached thereto so as to operate the high clutch HC. The clutch drum 65 always rotates at a time when the input shaft 12 rotates.

When the lockup clutch 23 is switched to the lockup state according to the traveling condition, the rotation of the crank shaft 11 is transmitted to the lockup disc 43. Next, the rotation of the lockup disc 43 is transmitted to the input shaft 12 via the turbine hub 42 after the rotational fluctuation of the engine is absorbed by the torsion damper 29, and further the rotation of the input shaft 12 is transmitted to the clutch drum 65 in which the inertial mass 34 is provided. The inertial mass 34 may be provided separately from the clutch drum 65, that is, mounted to the clutch drum 65.

As mentioned above, the inertia moment at the downstream side of the torsion damper 29 in the power transmitting path having the inertial mass 34 comes closer to the inertia moment at the upstream side, since the block-shaped inertial mass 34 is provided in the clutch drum 65 under the lockup state. Accordingly, the secondary resonance point in the power transmitting system, which is generated by the moments of inertia at the upstream side and the downstream side, the torsional rigidity of the torsion damper 29 provided between the both sides, and the torsional rigidity of the input shaft 12, can be lowered. In this case, the type of the AT is not limited to one as shown in FIG. 4, and every type may be employed as far as it has members connected to the input shaft 12 so as to rotate.

The present invention is not limited to the embodiments mentioned above, and can be variously modified within the scope of the invention. For example, although the whole of inertia mass 34 is provided at the outer periphery of the clutch drum 33 in all the figures, a partial portion thereof may be provided there.

In accordance with the present invention, the inertial mass functioning as the flywheel is provided at the downstream side of the power transmitting path via the torsion damper provided in the lockup clutch of the torque converter, thereby it is possible to make the inertia moment at the downstream side come closer to the inertia moment at the upstream side. Accordingly, the secondary resonance point in the power transmitting system can be lowered. As a result, it is possible to reduce the low-frequency sounds and vibrations transmitted within the passenger's compartment. Further, it is possible to expand the lockup area to the level of the low speed and high load area, in which the fuel consumption can be improved.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. A power transmitting apparatus including:
   a crankshaft of an engine for generating a power;
   an input shaft of an automatic transmission mechanically and coaxially connected to said crankshaft for changing a rotational speed thereof in accordance with operating conditions;
   a torque converter interposed between said crankshaft and said input shaft for smoothly connecting and disconnecting said power;
   a pump impeller directly connected to said crankshaft and included in said torque converter for rotating a fluid therein;
   a turbine runner provided to be opposed to said pump impeller for being rotated by said fluid; and
   a lockup clutch directly and coaxially connected to said input shaft for firmly connecting and entirely disconnecting thereof, said lockup clutch comprising:
      a torsion damper assembled in said torque converter for securing a torsion rigidity between said crankshaft and said input shaft; and
      an inertial mass provided at a downstream side of said torsion damper,
      wherein said inertial mass lowers a secondary resonance of said power transmitting apparatus.

2. A power transmitting apparatus according to claim 1, wherein said inertial mass decreases a noise and a vibration generated from said power transmitting apparatus.

3. The power transmitting apparatus of claim 1, further comprising:
   an input clutch provided between said input shaft and said turbine runner for engaging and disengaging said torque converter with said input shaft,
   wherein said input clutch comprises a clutch drum connected to said turbine runner, and
   wherein said inertial mass is integrally provided in said clutch drum.

4. The power transmitting apparatus of claim 3, wherein said inertial mass is formed by increasing a thickness of said clutch drum.

5. The power transmitting apparatus of claim 3, wherein said inertial mass is connected to a peripheral side of said input clutch.

6. The power transmitting apparatus of claim 1, wherein said input clutch further comprises a clutch disc connected to said input shaft, and wherein said inertial mass integrally rotates with said clutch disc.

7. The power transmitting apparatus of claim 1, wherein said lockup clutch further comprises a lockup disc, said lockup disc comprising:

an upstream side plate rotatably connected to said lockup disc; and a downstream side plate rotatably arranged outwardly in a radial direction of said upstream side plate, wherein said torsion damper is provided between said upstream side plate and said downstream side plate.

8. The power transmitting apparatus of claim 7, wherein a rotation of said upstream side plate is transmitted to said downstream side plate via said torsion damper.

9. The power transmitting apparatus of claim 7, wherein a rotation of said downstream side plate is transmitted to said input shaft via said inertial mass.

10. A power transmitting apparatus, comprising:

a crankshaft of an engine for generating a power;

an input shaft of an automatic transmission mechanically and coaxially connected to said crankshaft for changing a rotational speed thereof in accordance with operating conditions;

a torque converter interposed between said crankshaft and said input shaft for smoothly connecting and disconnecting said power;

a pump impeller directly connected to said crankshaft and included in said torque converter for rotating a fluid therein;

a turbine runner provided to be opposed to said pump impeller for being rotated by said fluid; and a lockup clutch directly and coaxially connected to said input shaft for firmly connecting and entirely disconnecting thereof, said lockup clutch comprising:

a torsion damper assembled in said torque converter for securing a torsion rigidity between said crankshaft and said input shaft; and an inertial mass provided at a downstream side of said torsion damper, wherein said inertial mass lowers a secondary resonance of said power transmitting apparatus by approximating an inertia of said downstream side to that of an upstream side of said torsion damper.

11. An automatic transmission, comprising:

a plurality of transmission drive gears forming a plurality of transmission gear trains;

a crankshaft for generating a power;

an input shaft of said automatic transmission mechanically and coaxially connected to said crankshaft for changing a rotational speed thereof in accordance with operating conditions, wherein said plurality of drive gears are connected to said input shaft;

a torque converter interposed between said crankshaft and said input shaft for connecting and disconnecting said power;

a pump impeller directly connected to said crankshaft and included in said torque converter for rotating a fluid therein;

a turbine runner provided to be opposed to said pump impeller for being rotated by said fluid; and a lockup clutch directly and coaxially connected to said input shaft for connecting and disconnecting thereof, said lockup clutch comprising:

a torsion damper assembled in said torque converter for securing a torsion rigidity between said crankshaft and said input shaft; and an inertial mass provided at a downstream side of said torsion damper, wherein said inertial mass lowers a secondary resonance of said power transmitting apparatus by approximating an inertia of said downstream side to that of an upstream side of said torsion damper.

12. The automatic transmission of claim 11, further comprising:

an input clutch connected to said turbine runner, wherein said inertial mass is integrally provided in said input clutch.

13. The automatic transmission of claim 11, further comprising:

an input clutch connected to said turbine runner, wherein said inertial mass is connected to a peripheral side of said input clutch.

14. The automatic transmission of claim 11, wherein said input clutch further comprises a clutch drum connected to said turbine runner, and wherein said inertial mass is integrally provided in said clutch drum.

15. The automatic transmission of claim 11, wherein said lockup clutch further comprises a lockup disc, said lockup disc comprising:

an upstream side plate rotatably connected to said lockup disc; and a downstream side plate rotatably arranged outwardly in a radial direction of said upstream side plate, wherein said torsion damper is provided between said upstream side plate and said downstream side plate.

16. The automatic transmission of claim 15, wherein a rotation of said upstream side plate is transmitted to said downstream side plate via said torsion damper.

17. The automatic transmission of claim 15, wherein a rotation of said downstream side plate is transmitted to said input shaft via said inertial mass.

18. A power transmitting apparatus, comprising:

a crankshaft for generating a power;

an input shaft of an automatic transmission mechanically connected to said crankshaft for changing a rotational speed thereof in accordance with operating conditions;

a torque converter interposed between said crankshaft and said input shaft;

a lockup clutch directly connected to said input shaft, said lockup clutch comprising:

a torsion damper assembled in said torque converter for securing a torsion rigidity between said crankshaft and said input shaft; and an inertial mass provided at a downstream side of said torsion damper, wherein said inertial mass approximates an inertial movement of said downstream side an of said torsion damper to an inertial movement of said upstream side of said torsion damper.

19. The power transmitting apparatus of claim 18, further comprising:

a pump impeller directly connected to said crankshaft and included in said torque converter for rotating a fluid therein.

20. The power transmitting apparatus of claim 19, further comprising:

a turbine runner provided to be opposed to said pump impeller for being rotated by said fluid.

21. The power transmitting apparatus of claim 20, further comprising:

an input clutch provided between said input shaft and said turbine runner for engaging and disengaging said torque converter with said input shaft, wherein said input clutch comprises a clutch drum connected to said turbine runner, and wherein said inertial mass is integrally provided in said clutch drum.

22. The power transmitting apparatus of 21, wherein said inertial mass is formed by increasing a thickness of said clutch drum.

23. The power transmitting apparatus of claim 21, wherein said inertial mass is connected adjacent to said input clutch.

24. The power transmitting apparatus of claim 18, wherein said inertial mass lowers a primary resonance of said power transmitting apparatus.

25. The power transmitting apparatus of claim 18, wherein said inertial mass lowers a secondary resonance of said power transmitting apparatus.

* * * * *